(12) United States Patent
Albanese (10) Patent No.: US 6,540,432 B2
(45) Date of Patent: Apr. 1, 2003

(54) STRUCTURAL FASTENER SYSTEM (76) Inventor: Andrew Albanese, 356 Neptune Dr., Manahawkin, NJ (US) 08050

( * ) Notice: Subject to any disclaimer, the term of this patent is extended or adjusted under 35 U.S.C. 154(b) by 0 days.

(21) Appl. No.: 09/899,211

(22) Filed: Jul. 6, 2001

(65) Prior Publication Data

US 2002/0051680 A1 May 2, 2002

Related U.S. Application Data (63) Continuation-in-part of application No. 09/702,986, filed on Nov. 1, 2000.

(51) Int. Cl.[7] .................................................. F16B 21/00
(52) U.S. Cl. ............................... 403/388; 403/6; 403/7; 403/384; 403/286; 403/231
(58) Field of Search ................................. 403/384, 388, 403/286, 231, 292, 300, 6, 7; 52/36.5, 483.1, 177, 729.1, 285.3, 359–363, 489.1, 489.2, 588.1, 713, 714, 465, 466, 459, 395; 108/108, 147.17; 24/336; 248/200, 547

(56) References Cited

U.S. PATENT DOCUMENTS

| | | | |
|---|---|---|---|
| 2,065,525 A | | 12/1936 | Hamilton |
| 2,081,368 A | * | 5/1937 | Pretot .................. 52/489.1 |
| 2,383,135 A | | 8/1945 | Lang |
| 3,423,899 A | | 1/1969 | Demers |
| 4,160,350 A | | 7/1979 | Craib |
| 4,178,063 A | * | 12/1979 | Reynolds |
| 4,183,485 A | * | 1/1980 | Gladieux .................. 24/336 |
| 4,296,580 A | | 10/1981 | Weinar |
| 4,498,272 A | | 2/1985 | Adams |
| 5,353,561 A | * | 10/1994 | Menchetti |
| 5,497,593 A | * | 3/1996 | Riesberg .................. 403/232.1 |
| 5,730,544 A | | 3/1998 | Dils et al. |
| 5,848,512 A | * | 12/1998 | Conn .................. 52/729.1 X |
| 5,953,878 A | | 9/1999 | Johnson |
| 5,997,209 A | | 12/1999 | Sachs |
| 6,322,178 B1 | * | 11/2001 | Dominique ............ 108/147.17 |

FOREIGN PATENT DOCUMENTS

| | | |
|---|---|---|
| CA | 2 140 022 | 1/1994 |
| CA | 2 185 888 | 9/1995 |
| CA | 2 277 586 | 7/2000 |
| CA | 2 287 104 | 1/2001 |

* cited by examiner

*Primary Examiner*—Gregory J. Binda
*Assistant Examiner*—Victor MacArthur
(74) *Attorney, Agent, or Firm*—Richard C. Litman (57) ABSTRACT

A fastener system for joining structural members to other structural members or to supporting structures is disclosed. The fastener system includes three types of fasteners. The first type of fastener is designed for placement between adjacent planks. The second and third types of fastener are designed for placement at the ends or sides of planks which are not adjacent other planks. The first type of fastener is in the form of two rectangular, spaced apart plates which are fixed relative to one another by a rectangular plate extending perpendicularly between the two rectangular plates. The second and third types of fasteners are in the form of a rectangular plate having two rectangular, spaced apart plates projecting perpendicularly therefrom.

11 Claims, 9 Drawing Sheets

STRUCTURAL FASTENER SYSTEM

CROSS-REFERENCE TO RELATED APPLICATION

This application is a continuation-in-part of the U.S. patent application Ser. No. 09/702,986 filed Nov. 1, 2000.

BACKGROUND OF THE INVENTION

1. Field of the Invention

The present invention relates to a fastener system for joining structural members to other structural members or to supporting structures.

2. Description of Related Art

It is common practice to join structural members using nails, for example when constructing a house or a deck, which are driven through one structural member and into another structural member. Seasonal changes in temperature and/or humidity cause expansion and contraction of the structural members with the result that, over time, the nails have a tendency to be pushed out of the structural members. This tendency is particularly evident with wooden structural members. To remedy the problem described above and to strengthen the joints between wooden structural members, bracket-like fasteners which are independently nailed to two structural members which are to be joined together, have been proposed in the art. The bracket-like fasteners are made of metal and are less prone to expansion, contraction, and warpage as compared to wood. Examples of fasteners which facilitate the joining together of structural members, can be seen among the references cited below. However, none of the references cited below teach or suggest the unique structure of the fastener system of the present invention.

U.S. Pat. No. 5,865,586, issued to Richard L. Neville on Feb. 2, 1999, is directed to a device for securing one log to another. The Neville device is in the form of a disc with sharp projections on either side of the disc.

U.S. Pat. No. 5,842,319, issued to George D. Ravetto on Dec. 1, 1998, is directed to a connector for use in building decks. The Ravetto connector is in the form of a disc having ribbed nails projecting from either side thereof. The disc has angled clearance holes to allow oblique screws, passing through the disc, to secure the deck planks to the deck joists.

U.S. Pat. No. 5,027,573, issued to Alfred D. Commins et al. on Jul. 2, 1991, is directed to a connector for deck planks. The connector of Commins et al. includes an upright member which projects perpendicularly from a flanged base. The upright member fits between adjacent planks and has a hole for allowing the connector to be nailed to one of the adjacent pair of planks.

U.S. Pat. No. 5,014,482, issued to Michael E. Alexander on May 14, 1991, is directed to a device for retaining an insulating blanket in place. The Alexander device includes a L-shaped bracket having a rod, which is pointed at both ends, extending therethrough.

U.S. Pat. No. 4,965,980, issued to Weston Leavens on Oct. 30, 1990, is directed to a deck bracket having an elongated base and a plurality of upright tabs projecting from the elongated base. The base of the deck bracket is designed to be nailed to the deck joists. The tabs help position the deck planks with the proper spacing. The base of the deck bracket also has holes for obliquely oriented screws which are used to secure the planks to the base of the deck bracket.

U.S. Pat. No. 4,925,141, issued to Mickey Classen on May 15, 1990, and Canadian Patent Number 1,290,131, issued to Mickey E. J. Classen on Oct. 8, 1991, are directed to a deck bracket for joining the planks of a deck to the joists of the deck. The deck bracket of Classen is nailed to the joist such that a portion of the bracket having sharp projection on either side thereof is positioned between an adjacent pair of planks.

U.S. Pat. No. 4,844,651, issued to Juergen W. Partridge on Jul. 4, 1989, is directed to a fastener for securing the planks of a deck to one another and to the deck joists. Each fastener is in the form of a rectangular strip having nail holes at both ends. A stamped out shank extends perpendicularly from the rectangular strip and supports a sharp projection parallel to the rectangular strip.

U.S. Pat. No. 4,620,403, issued to Gerald L. Field on Nov. 4, 1986, is directed to a nailing anchor for attaching a series of parallel planks to a supporting joist. The nailing anchor of Field has two horizontal tabs that are nailed to the joist. The tabs are attached to a spacer plate which fits between an adjacent pair of planks. A sharp projection extends from one side of the spacer plate into one of the adjacent pair of planks, and an oblique nail is driven through the spacer plate and into the other one of the adjacent pair of planks and the joist to secure the planks to the joist.

U.S. Pat. No. 2,620,705, issued to Stephen J. Podvinecz et al. on Dec. 9, 1952, is directed to a fastening device in the firm of a metal strip having sharp barbed projections extending at right angles to the longitudinal axis of the metal strip.

U.S. Pat. No. 1,995,173, issued to Harley B. Ehle et al. on Mar. 19, 1935, is directed to a fastener for wall board. The fastener of Ehle et al. has two pairs of parallel spikes extending from a metal strip. Each pair of parallel spikes extends in a direction opposite the direction in which the other pair of spikes extends.

U.S. Pat. No. 1,784,843, issued to Albert Lösch on Dec. 16, 1930, is directed to a fastener in the form of an L-shaped piece of angle iron having pins projecting from either side of one of the plates forming the angle iron.

U.S. Pat. No. 638,386, issued to Charles S. Farrow on Dec. 5, 1899, is directed to a fastener for attaching planks to supporting joists. The fastener of Farrow has one or more spikes arrayed at one end thereof which are intended to penetrate the planks. The other end of the fastener has an eye or a spike intended for use in securing the fastener to the supporting joists.

U.S. Pat. No. 554,908, issued to Nels Brunes on Feb. 18, 1896, is directed to a fastener for attaching planks to supporting joists. The fastener of Brunes has a flat central body having a centrally located hole which allows the fastener to be nailed to a supporting joist. One or more spikes project from the flat central body and are intended to engage the planks.

U.K. Patent Specification Number 1,180,687, by Willy Menig, published on Feb. 11, 1970, is directed to a nail plate for joining structural members. The Menig device is a perforated plate having a nail which is pointed at both ends extending through each perforation.

U.K. Patent Specification Number 203,030, by Charles Wilkin Cope, dated Aug. 29, 1923, is directed to a device for hanging pictures on a wall. The Cope device is in the form of a rectangular I-shaped structure with pins projecting on either side of the fastener.

None of the above inventions and patents, taken either singly or in combination, is seen to describe the instant invention as claimed.

SUMMARY OF THE INVENTION

The present invention relates to a fastener system for joining structural members to other structural members or to supporting structures. The fastener system includes three types of fasteners. The first type of fastener is designed for placement between adjacent planks. The second and third types of fastener are designed for placement at the ends or sides of planks which are not adjacent other planks.

The first type of fastener is in the form of two circular, spaced apart plates which are fixed relative to one another by a rectangular plate extending perpendicularly between two rectangular plates. The rectangular plates are of uniform thickness such that with thickest point being at the adjoining center and form a comparatively sharp edges at the outer edge of the rectangular plates. The upper rectangular plate has a clearance hole for the head of a wood screw, while the lower rectangular plate has a counter sunk hole that has enough clearance for the shaft of a wood screw only. The holes in the upper and lower plates are in registry with one another.

The second type of fastener is in the form of a rectangular plate having two rectangular, spaced apart plates projecting perpendicularly therefrom. The rectangular plate has a pair of countersunk holes for attachment to a supporting structure. One side of each rectangular plate is perpendicular to the adjoining rectangular plate. In the second type of fastener, the side of each plate which is perpendicular to the rectangular plate, faces away from the location of the countersunk holes.

The third type of fastener is generally similar to the second type of fastener except for the following differences. In the third type of fastener, the side of each plate which is perpendicular to the rectangular plate, faces toward the location of the countersunk holes. In addition, the countersunk holes in the third type of fastener are oriented in a direction opposite the countersunk holes in the second type of fastener.

Accordingly, it is a principal object of the invention to provide a fastener system for joining structural members to one another, or to supporting structures, without having to drive a nail through both the structural member and the structure to which the structural member is being joined.

It is another object of the invention to provide a fastener system for joining structural members to one another, or to supporting structures, which will obviate the need for driving nails or screws at non-perpendicular angles relative to the surfaces of the structural members.

It is a further object of the invention to provide a fastener system for joining structural members to one another, or to supporting structures, which includes different types of fastener hardware, with each type of hardware being suited for a different type of joint within a structure.

Still another object of the invention is to provide a fastener system for joining structural members to one another, or to supporting structures, which will provide an aesthetically pleasing appearance to the finished structure.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a system of I-shaped structural fastener brackets for joining structural members to other structural members or to supporting structures. The system of structural fasteners include substantially rectangular shaped features which form three types of fastener brackets. The first type of fastener bracket is designed for placement between adjacent structural members such as planks. The second and third types of fastener bracket are designed for placement at the ends or sides of planks, for example, which are not adjacent other planks.

Figure 4:
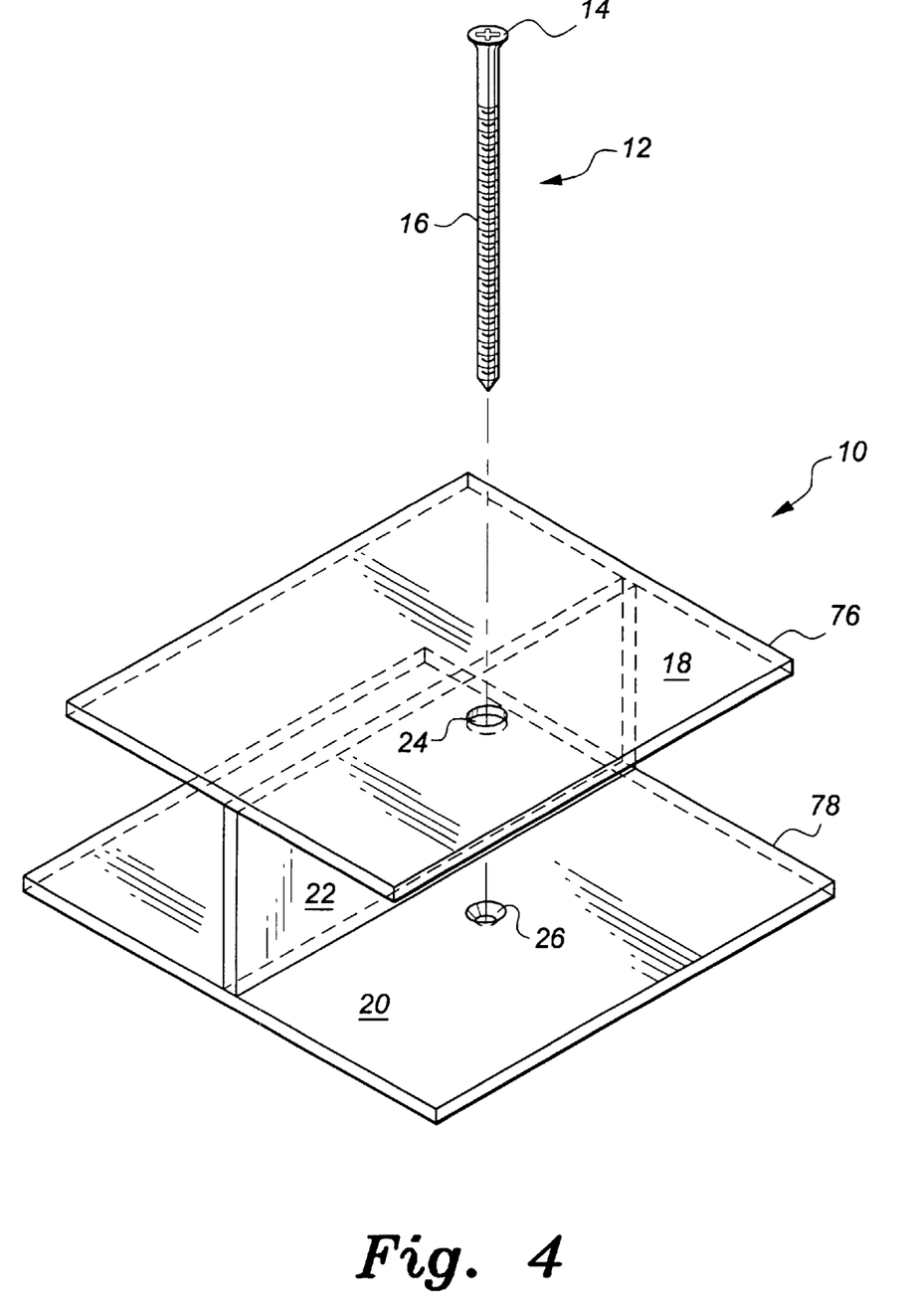
FIG. 4 is an exploded perspective view showing a structural fastener of the present invention for placement between planks.
Figure 5:
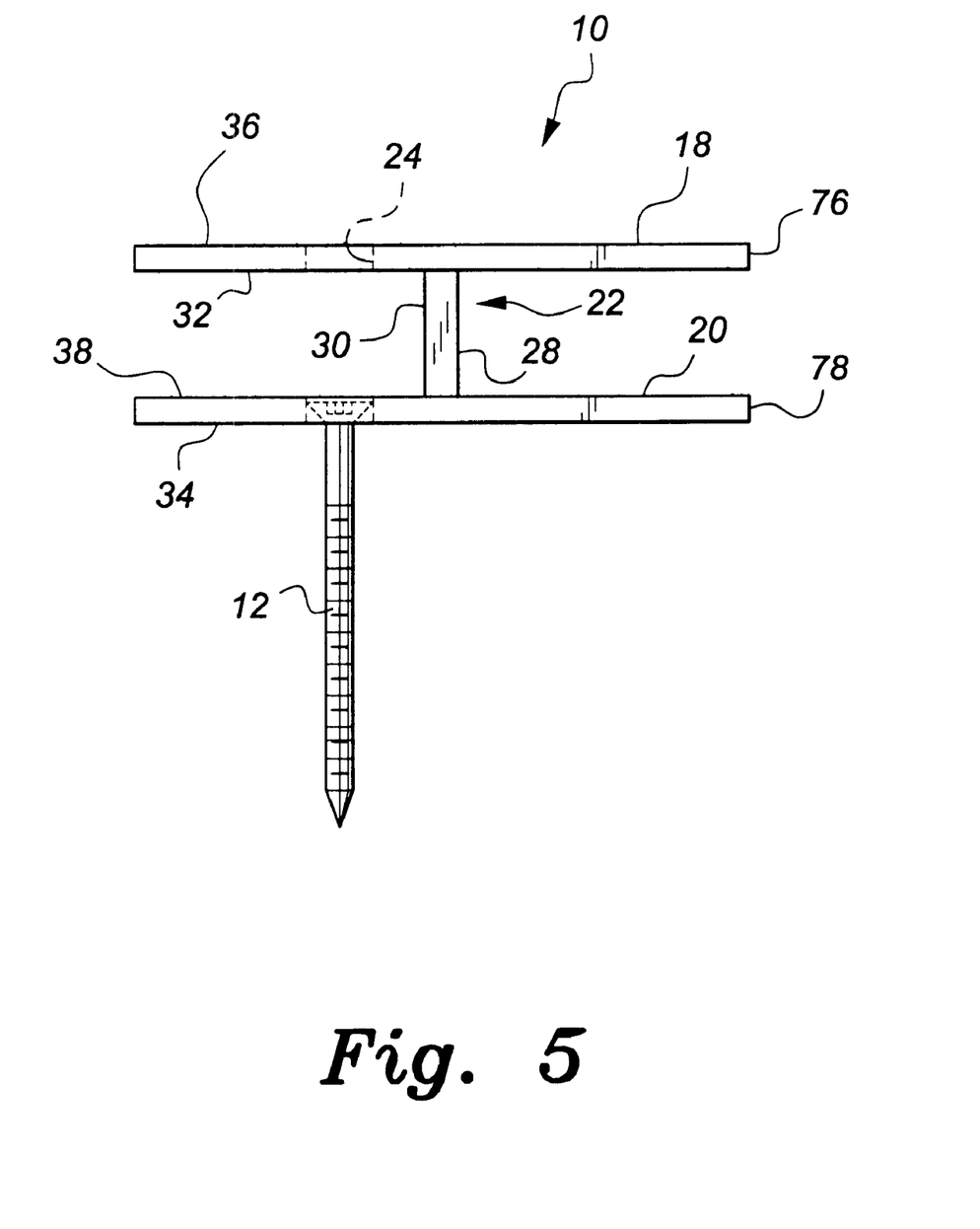
FIG. 5 is a view in side elevation showing a structural fastener of the present invention for placement between planks.

Referring to FIGS. 4 and 5, the first type of fastener bracket 10 can be seen as a substantially rectangular bracket. The structural fastener bracket 10 is adapted for being secured to a supporting structure by a screw 12 having a flat head 14 and a threaded shaft 16. The screw 12 is preferably of a type that does not require a pre-drilled hole, such as wood screws and lag screws.

The structural fastener bracket 10 includes a first plate 18, a second plate 20, and a third plate 22. The first plate 18 has a clearance hole 24 having a diameter greater than the head 14 of the screw 12 providing at least enough clearance for the head 14 of the screw 12 to pass through the clearance hole. Preferably, the diameter of the clearance hole 24 should be large enough for a tool such as a screw driver, used to drive the screw 12 into some supporting structure, to pass therethrough.

The second plate 20 is disposed substantially parallel to and spaced apart from said first plate 18. The first plate 18 is superimposed upon the second plate 20 in plan view. The second plate 20 has a countersunk hole 26. The countersunk hole 26 has a diameter greater than the diameter of the shaft 16 of the screw 12 but less than the diameter of the head 14 at its widest point. The countersunk hole 26 is a conically tapered hole adapted for being engaged by the head of the screw 12 such that the head of the screw 12 does not project above the top surface of the plate 20 once the screw 12 is used to secure the fastener bracket 10 to a supporting structure. The countersunk hole 26 is in registry with the clearance hole 24.

The third plate 22 extends between the first plate 18 and the second plate 20 to thereby fix the first plate 18 relative to the second plate 20. The third plate 22 is substantially rectangular and is substantially perpendicular to both plates 18 and 20. The plate 22 has two large faces 28 and 30, and the distance between the faces 28 and 30, measured in a direction perpendicular to both faces 28 and 30, is the thickness dimension of the plate 22.

The first plate 18 and the second plate 20 are of uniform thickness with increasing distance from the third plate 22 when the structural fastener bracket 10 is viewed in side elevation by a viewer, along a line of sight passing through the thickness of the plate 22 in a direction perpendicular to the thickness dimension of the third plate 22 and passing intermediate the first plate 18 and the second plate 20. Such a view of the fastener bracket 10 is shown in FIG. 5. The first plate 18 and the second plate 20 are substantially rectangular in plan view, and the third plate 22 has a length substantially equal to the width or area dimension of the plates 18 and 20. The third plate 22 is positioned intermediate the plates 18 and 20 in a manner such that a plane cooperatively defined by a diameter of the first plate 18 and a diameter of the second plate 20 bisects the thickness dimension of the third plate 22. The third plate 22 can be said to be approximately perpendicular to the plates 18 and 20.

The rectangular plates 18 and 20 are of uniform thickness such, except that the plates are thickest at the center of plate intersection due to bonding techniques. Each of the plates 18 and 20 form a comparatively sharp edge, 76 and 78 respectively, at the outer edge of each of the rectangular plates. Thus, when viewed in side elevation as depicted in FIG. 5, each of the plates 18 is in the form of a pair of wedges placed back to back with the relatively sharp edges of the pair of wedges projecting in opposite directions. The fastener bracket 10 can then be thought of as a flat plate having a top pair of wedges and a bottom pair of wedges. The top pair of wedges project from either side of the plate 22 at the top of the plate 22, and the bottom pair of wedges project from either side of the plate 22 at the bottom of the plate 22. Preferably, the underside (referenced by numerals 32 and 34) of each of the plates 18 and 20 is flat, while the top surface (referenced by numerals 36 and 38) of each of the plates 18 and 20 has relatively sharp edges. The flat underside of plate 20 allows the fastener bracket 10 to sit stably on a supporting structure.

Figure 1:
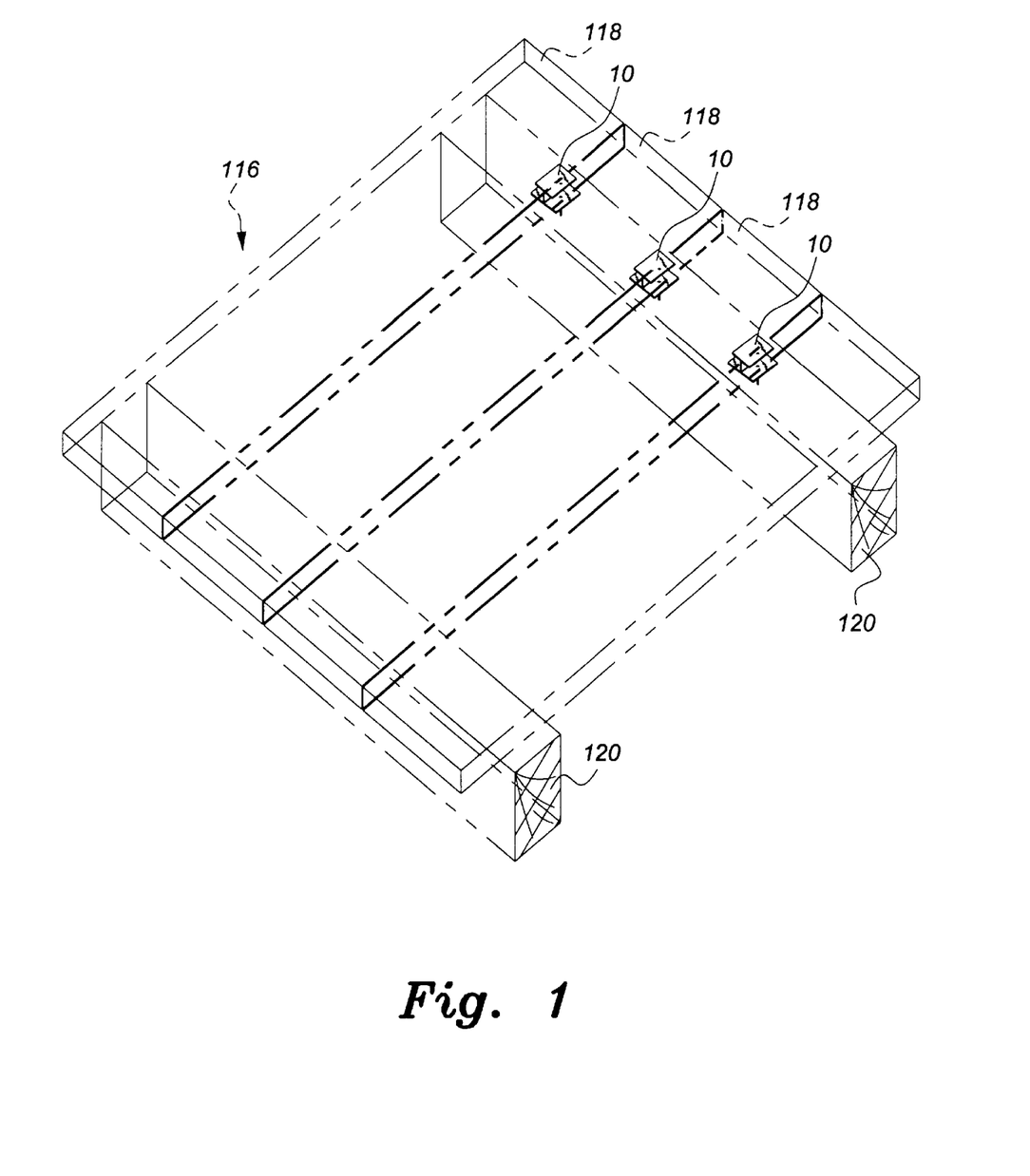
FIG. 1 is an environmental view of a structural fastener for placement between planks, made in accordance with the present invention.
Figure 2:
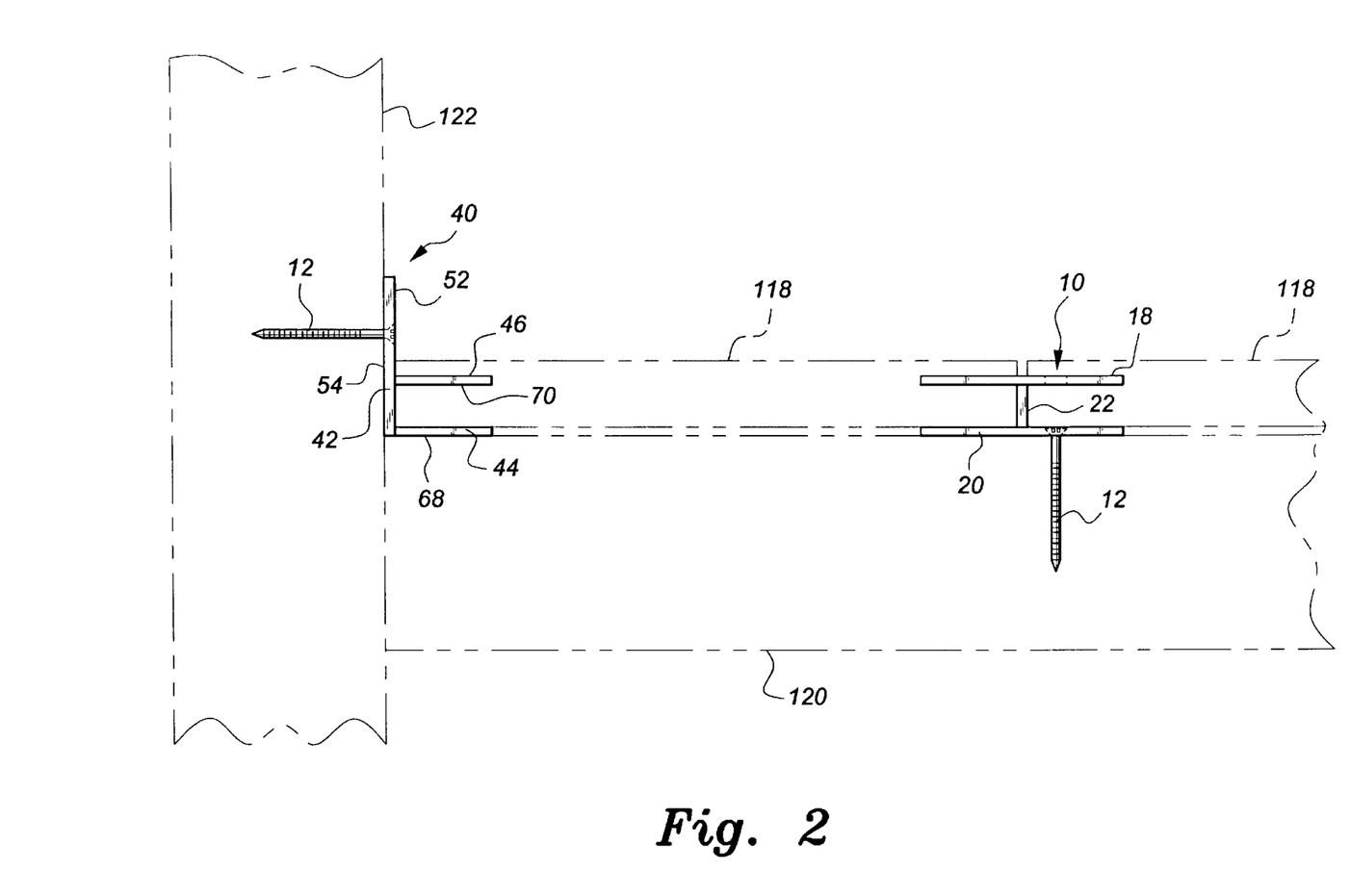
FIG. 2 is an environmental view showing both a structural fastener of the present invention for placement between planks and a structural fastener of the present invention for placement at the ends of planks, cooperatively securing a plank to a supporting joist.
Figure 3:
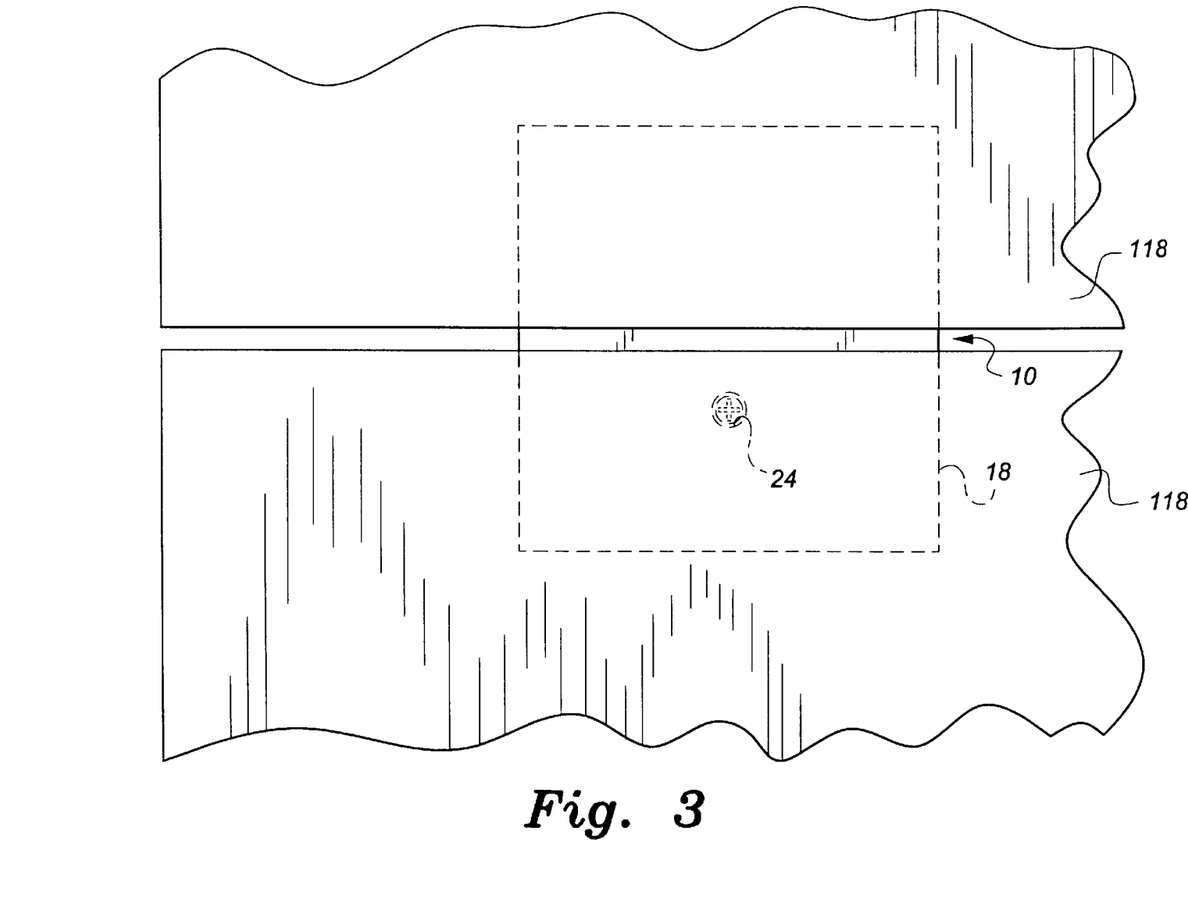
FIG. 3 is an environmental view showing a structural fastener of the present invention placed between adjacent ends of two planks.
Figure 6:
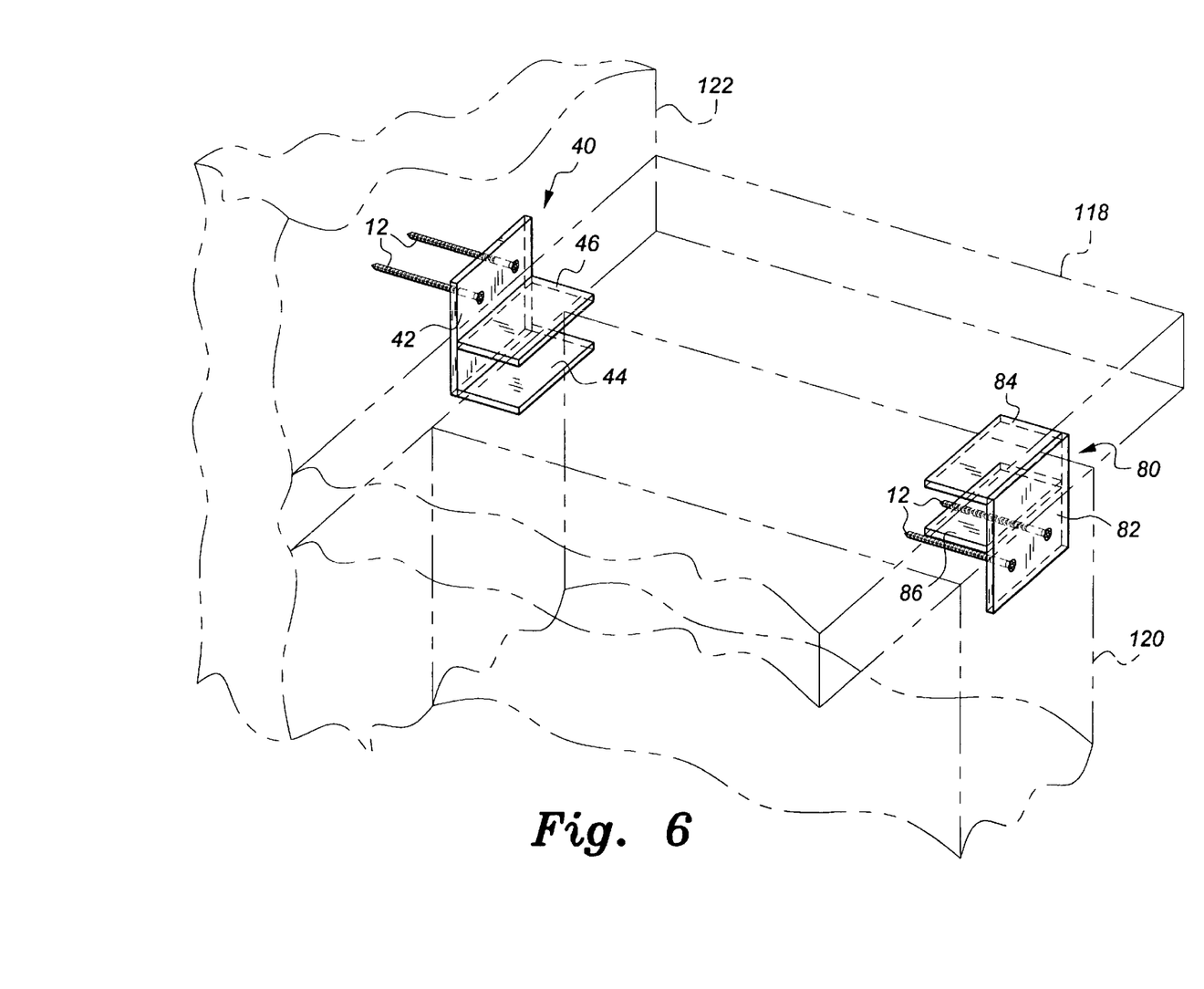
FIG. 6 is an environmental view showing two structural fasteners of the present invention, designed for placement at the ends of planks, cooperatively securing a plank to a supporting joist.
Figure 7:
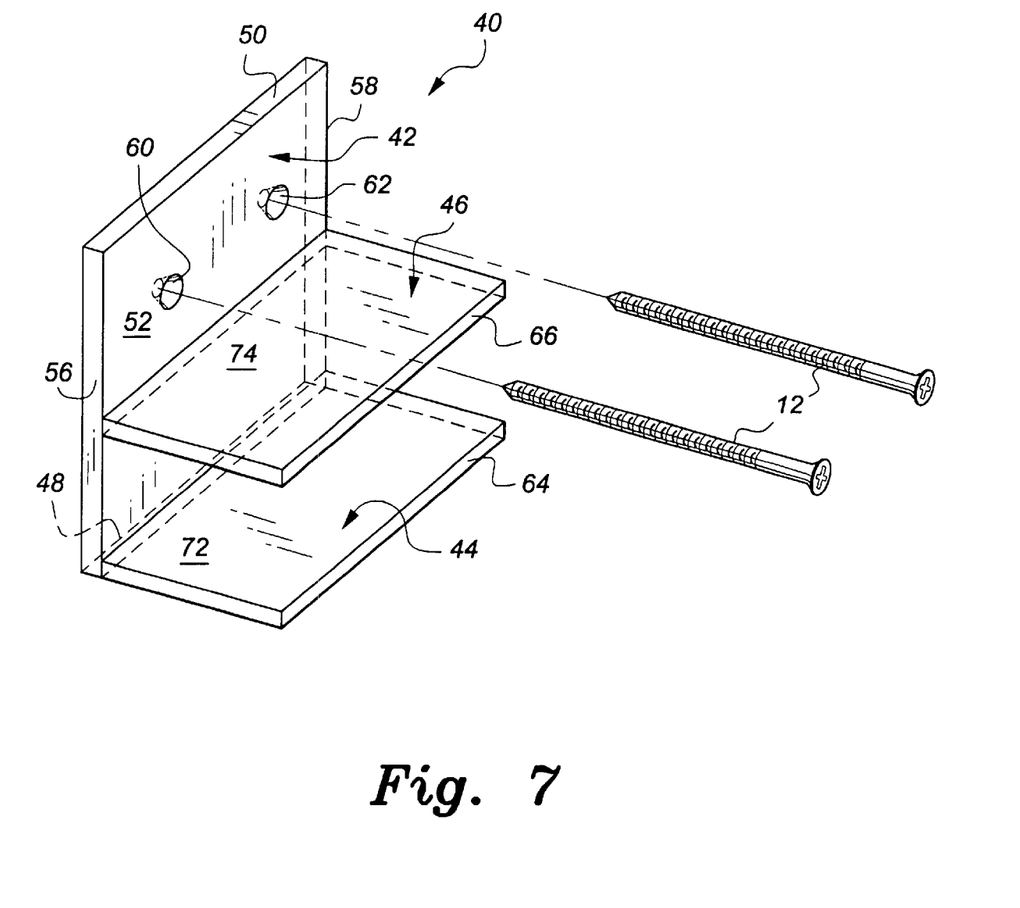
FIG. 7 is an exploded perspective view showing a structural fastener of the present invention for placement at the ends of planks.

Referring to FIGS. 2, 6, and 7, the second type of fastener bracket 40 can be seen. The structural fastener bracket 40 is adapted for being secured to an adjacent supporting structure by a pair of screws 12. The structural fastener bracket 40 may also be nailed to the adjacent supporting structure depending on the nature of the adjacent supporting structure, however, using screws is preferred in almost all cases. The structural fastener bracket 40 includes a first plate 42, a first wedge 44, and a second wedge 46. The first and second wedges 44 and 46 are spaced apart and project approximately perpendicularly from the first plate 42. The first plate 42 has a first edge 48, a second edge 50, a first face 52, a second face 54, and a width extending from the side edge 56 to the side edge 58. The first plate 42 is substantially rectangular and has a pair of countersunk holes 60 and 62. Each of the countersunk holes 60 and 62 is adapted for engagement by the head of a respective one of the screws 12. The first wedge 44 projects from the first face 52 of the first plate 42. Also, the first wedge 44 is attached to the first plate 42 along the first edge 48.

The second wedge 46 projects from the first face 52 of the first plate 42 intermediate the first wedge 44 and the second edge 50 of the first plate 42. The second wedge 46 is attached to the first plate 42 along the width of the first plate 42. The second wedge 46 is disposed substantially parallel to and spaced apart from the first wedge 44. The second wedge 46 is superimposed upon the first wedge 44 in plan view. The pair of countersunk holes 60 and 62 are located intermediate the second wedge 46 and the second edge 50 of the first plate 42.

The first plate 42 has a thickness dimension extending between the faces 52 and 54 of the first plate 42. The first wedge 44 and the second wedge 46 are of uniform thickness with increasing distance from the first plate 42 when the structural fastener bracket 40 is viewed in side elevation by a viewer along a line of sight passing through the thickness of the plate 42 in a direction perpendicular to the thickness dimension of the first plate 42 and parallel to the width of the plate 42. Thus when viewed in side elevation, the wedges 44 and 46 are thickest adjacent the plate 42 and taper in thickness to relatively sharp edges referenced by numerals 64 and 66, respectively.

The first wedge 44 and the second wedge 46 are substantially rectangular in plan view. The countersunk holes 60 and 62 are oriented such that the holes 60 and 62 are widest at the first face 52 of the first plate 42. The undersides 68 and 70 of each of the wedges 44 and 46, respectively, are flat and essentially perpendicular to the first face 52 of the first plate 42. The top surfaces 72 and 74 of each of the wedges 44 and 46, respectively, are relatively sharp edges 64 and 66. The underside of each wedge 44 and 46 faces away from the location of the countersunk holes 60 and 62.

Figure 8A:
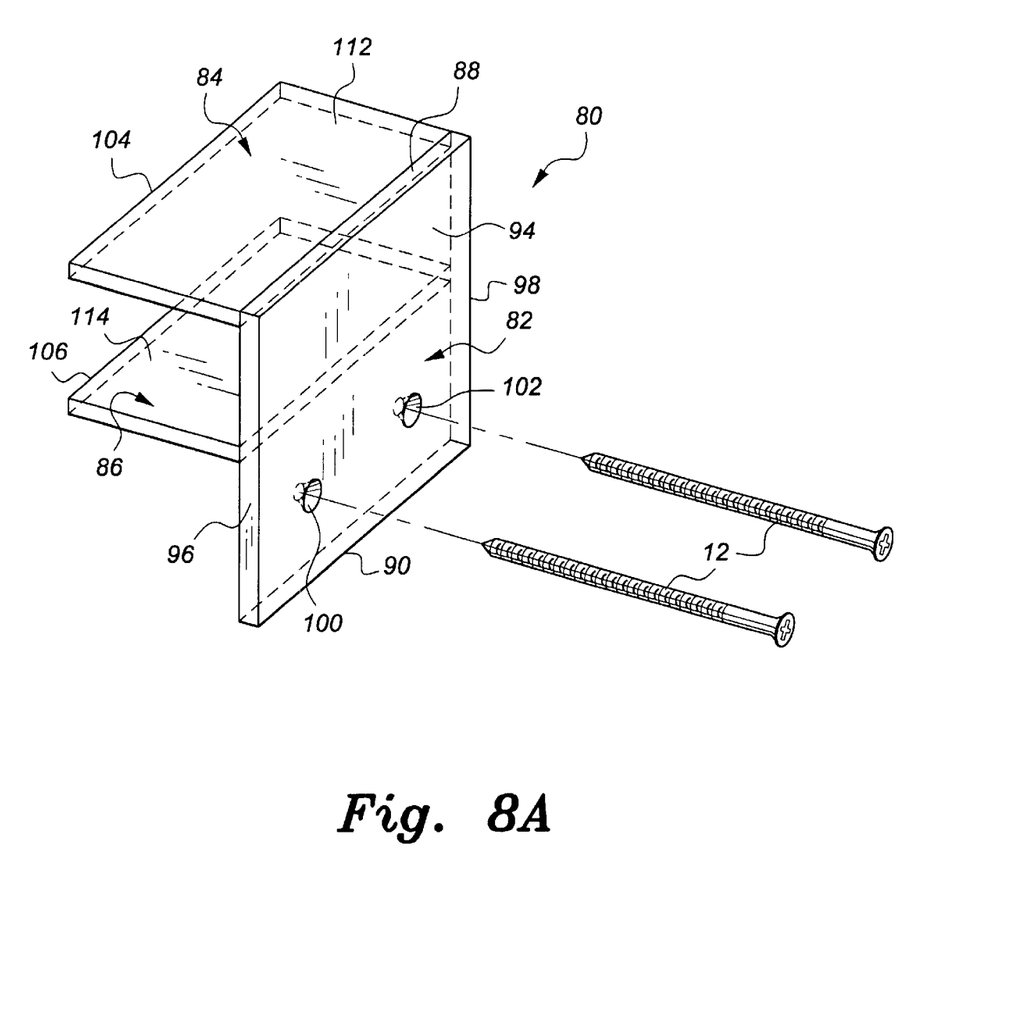
FIG. 8A is an exploded perspective view showing a second type of structural fastener for placement at the ends of planks.
Figure 8B:
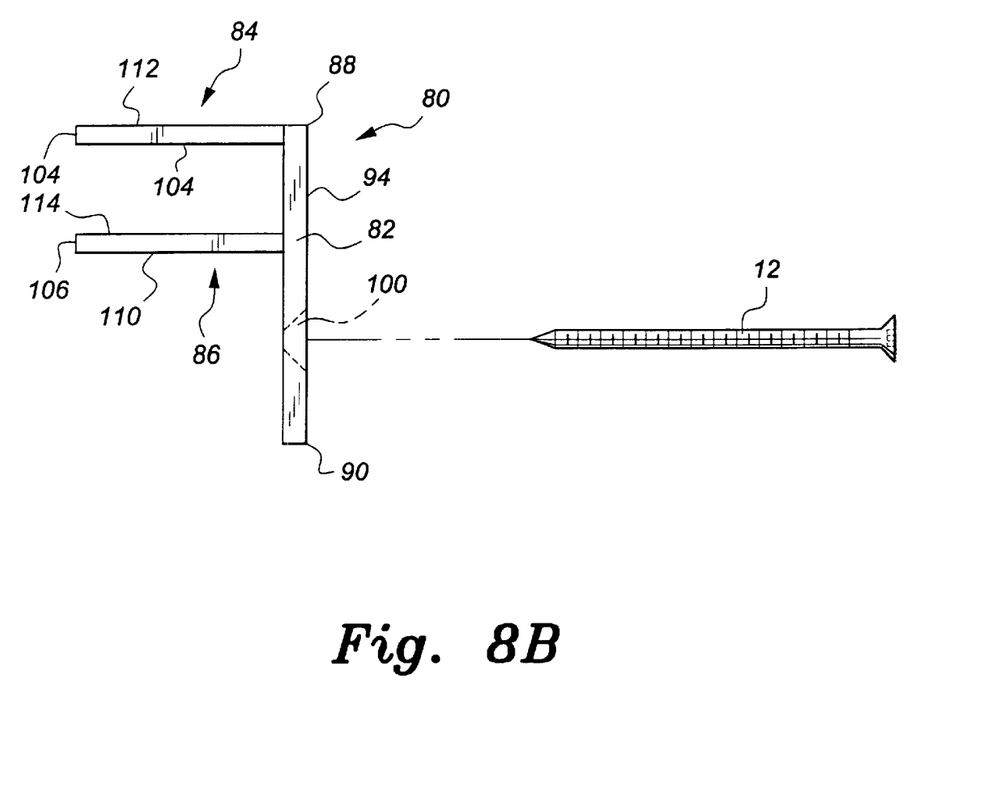
FIG. 8B is a view in side elevation showing a second type of structural fastener for placement at the ends of planks.

Referring to FIGS. 8A and 8B, the third type of fastener bracket 80 can be seen. The structural fastener bracket 80 is adapted for being secured to an underlying supporting structure by a pair of screws 12. The structural fastener bracket 80 may also be nailed to the underlying supporting structure depending on the nature of the underlying supporting structure, however, using screws is preferred in almost all cases. The structural fastener bracket 80 includes a first plate 82, a first wedge 84, and a second wedge 86. The first and second wedges 84 and 86 are spaced apart and project approximately perpendicularly from the first plate 82. The first plate 82 has a first edge 88, a second edge 90, a first face 92, a second face 94, and a width extending from the side edge 96 to the side edge 98. The first plate 82 is substantially rectangular and has a pair of countersunk holes 100 and 102. Each of the countersunk holes 100 and 102 is adapted for engagement by the head of a respective one of the screws 12. The first wedge 84 projects from the first face 92 of the first plate 82. Also, the first wedge 84 is attached to the first plate 82 along the first edge 88.

The second wedge 86 projects from the first face 92 of the first plate 82 intermediate the first wedge 84 and the second edge 90 of the first plate 82. The second wedge 86 is attached to the first plate 82 along the width of the first plate 82. The second wedge 86 is disposed substantially parallel to and spaced apart from the first wedge 84. The first wedge 84 is superimposed upon the second wedge 86 in plan view. The pair of countersunk holes 100 and 102 are located intermediate the second wedge 86 and the second edge 90 of the first plate 82.

The first plate 82 has a thickness dimension extending between the faces 92 and 94 of the first plate 82. The first wedge 84 and the second wedge 86 are of uniform thickness with increasing distance from the first plate 82 when the structural fastener bracket 80 is viewed in side elevation by a viewer along a line of sight passing through the thickness of the plate 82 in a direction perpendicular to the thickness dimension of the first plate 82 and parallel to the width of the plate 82. Thus when viewed in side elevation, the wedges 84 and 86 are thickest at the adjacent the plate 82 due to bonding techniques as referenced by numerals 104 and 106, respectively.

The first wedge 84 and the second wedge 86 are substantially rectangular in plan view. The countersunk holes 100 and 102 are oriented such that the holes 100 and 102 are widest at the second face 94 of the first plate 82. The undersides 108 and 110 of each of the wedges 84 and 86, respectively, are flat and essentially perpendicular to the first face 92 of the first plate 82. The top surfaces 112 and 114 of each of the wedges 84 and 86, respectively, are relatively sharp edges 104 and 106 of the wedges 84 and 86. The underside of each wedge 84 and 86 faces toward the location of the countersunk holes 100 and 102.

The third type of fastener bracket 80 is generally similar to the second type of fastener bracket 40 except for the differences noted below. In the third type of fastener bracket 80, the underside of each of the rectangular wedges 84 and 86 faces toward the location of the countersunk holes 100 and 102. In addition, the countersunk holes 100 and 102 in the third type of fastener bracket 80 are oriented in a direction opposite the direction of orientation of the countersunk holes 60 and 62 of the second type of fastener bracket 40.

Referring to FIGS. 1, 2, 3, and 6, the application of the fastener brackets 10, 40, and 80 will be explained in the context of building a wooden deck 116 which is constructed of wooden planks 118 supported by joists 120 extending perpendicularly to the planks 118. The joists 120 are usually supported by posts which are in turn supported by concrete footings. Also, the typical deck 116 has at least one side which abuts another structure such as the wall 122 of a house. The typical deck 116 will also have at least one edge distal from the wall 122 along which a handrail (not shown) is usually provided.

Once the joists 120 are in place, the fastener brackets 40 are screwed into the wall 122 such that the flat underside of the wedge 44 rests on the top of the joist 120. A selected number of the joists 120 would ordinarily be provided with fastener brackets 40. Once the fastener brackets 40 are in place, the first row of planks 118 can be placed across the joists 120. The planks 118 are then tapped toward the plates 42 such that the wedges 46 are driven into the sides of the planks 118.

Once the first row of planks 118 is in place, fastener brackets 10 are placed on the joists 120 such that the flat underside of the plate 20 rests on the joist 120. The holes 24 and 26 should be on the side of the plate 22 facing away from the planks 118 abutting the wall 122 of the house. A piece of scrap wood or metal is then placed against the plate 22 and the fastener bracket 10 is tapped toward the planks 118 to drive half the plate 18 into the side of the plank and half the plate 20 under the plank. Once the plate 22 contacts the plank, the fastener bracket 10 is screwed to the joist 120. This procedure is repeated until the entire row of planks are secured in place. The next row of planks 118 can then be placed across the joists 120. The planks 118 of the next row are then tapped toward the plates 22 such that the other half of the plates 18 are driven into the sides of the planks 118 of the next row of planks, while the other half of the plates 20 are driven under the planks 118 of the next row of planks.

Once the second row of planks are in place, another plurality of fastener brackets 10 are used, in the same manner as has already been described, to secure the second row of planks in place. This process is repeated until the outer side of the last row of planks 118 coincides with the edge of the deck 116 which is distal from the wall 122. A plurality of the fastener brackets 80 are then tapped into the sides of the last row of planks such that the wedges 84 are driven into the sides of the planks and the wedges 86 are driven under the last row of planks with the underside of the wedges 86 lying flat atop respective joists 120. The fastener brackets 80 are then secured to their respective joists 120 by driving screws 12 into the joists 120 through the holes 100 and 102. In addition to the sides of the planks 118, the wedges 46 and 84 and the plates 18 may be driven into the ends of the planks 118 where appropriate.

As an alternative to driving the wedges 46 and 84 and the plates 18 into the planks 118, slots for the wedges 46 and 84 and the plates 18 can be cut into the planks 118 using a well known tool called a biscuit cutter. The wedge shaped profile of the wedges 46 and 84 and the plates 18 ensures that the planks 118 will be securely frictionally gripped by the fastener brackets 10, 40, and 80 once the plates 22, 42, and 82 are brought into contact with the planks 118.

It is to be understood that the present invention is not limited to the embodiments described above, but encompasses any and all embodiments within the scope of the following claims.

I claim:

1. A structural fastener bracket adapted for being secured to a fixed support by a screw having a head, the structural fastener bracket comprising:
   a first plate having a circular clearance hole defined therein;
   a second plate disposed substantially parallel to and spaced apart from said first plate, said second plate having a circular countersunk hole defined therein, the countersunk hole being in alignment with the clearance hole, the countersunk hole having a diameter smaller than the diameter of the clearance hole;
   a third plate extending between and connecting said first plate to said second plate, the third plate being substantially perpendicular to said first plate and second plate and bisecting said first plate and said second plate in order to define a first half and a second half of said first and second plates, respectively;
   wherein said first, second and third plates are substantially rectangular; and
   whereby the screw is adapted for insertion through the clearance hole and for being secured in a fixed support with the head engaging the countersunk hole so that the first and second halves of said first plate are adapted for insertion into slots defined in an edge of adjoining planks, the adjoining planks resting on said second plate.

2. The structural fastener bracket according to claim 1, wherein said third plate has a thickness dimension, and said third plate has a length substantially equal to a length of said first plate.

3. The structural fastener bracket of claim 1, wherein said second plate has a larger width than said first plate.

4. The structural fastener bracket of claim 1, wherein the bracket is made from metal.

5. In combination with a fixed support, a fastener bracket comprising:

a first plate having a circular clearance hole defined therein;

a second plate disposed substantially parallel to and spaced apart from said first plate, said second plate having a circular countersunk hole the countersunk hole being in alignment with said clearance hole, the countersunk hole having a diameter smaller than the diameter of the clearance hole;

a third plate extending between and connecting said first plate to said second plate, the third plate being substantially perpendicular to said first plate and said second plate and bisecting said first plate and said second plate in order to define a first half and a second half of said first and second plates, respectively; and whereby a screw is adapted for insertion through the clearance hole and for being secured in the fixed support with the head engaging the countersunk hole so that the first and second halves of said first plate are adapted for insertion into slots defined in an edge of adjoining planks, the adjoining planks resting on said second plate.

6. The structural fastener bracket according to claim 5, wherein said third plate has a thickness dimension, said third plate has a length substantially equal to a length of said first plate.

7. The structural fastener bracket according to claim 5, wherein said supporting structure is a metallic supporting structure.

8. The structural fastener bracket according to claim 7, wherein said supporting structure is aluminum.

9. The structural fastener bracket according to claim 7, wherein said supporting structure is made of a stain-less steel material.

10. The structural fastener bracket according to claim 5, wherein said supporting structure is made of a high impact plastic material.

11. In combination with a screw having a flat head and a threaded shaft, a fastener bracket comprising:

a first plate having a circular clearance hole defined therein, said clearance hole having a diameter greater than the diameter of the head of the screw;

a second plate disposed substantially parallel to and spaced apart from said first plate, said second plate having a circular countersunk hole the countersunk hole being in alignment with said clearance hole, the countersunk hole having a diameter less than the diameter of the head of the crew and greater than the shaft of the screw;

a third plate extending between and connecting said first plate to said second plate the third plate being substantially perpendicular to said first plate and said second plate and bisecting said first plate and said second plate in order to define a first half and a second half of said first and second plates, respectively; and whereby the screw is adapted for insertion through the clearance hole and for being secured in the fixed support with the head engaging the countersunk hole so that the first and second halves of said first plate are adapted for insertion into slots defined in an edge of adjoining planks, the adjoining planks resting on said second plate.

* * * * *